Dec. 26, 1950 G. E. DATH 2,535,197
SHOCK ABSORBING MECHANISM FOR
RAILWAY DRAFT RIGGINGS
Filed Nov. 14, 1946 2 Sheets-Sheet 1

Inventor:
George E. Dath:
By Henry Fuchs.
Atty.

Dec. 26, 1950 G. E. DATH 2,535,197
SHOCK ABSORBING MECHANISM FOR
RAILWAY DRAFT RIGGINGS
Filed Nov. 14, 1946 2 Sheets—Sheet 2
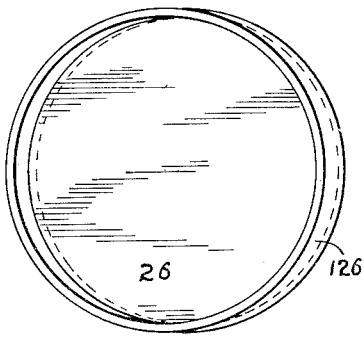
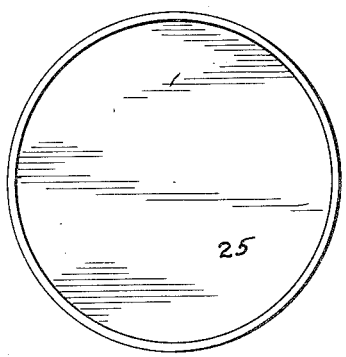
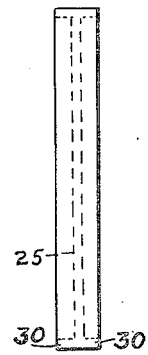
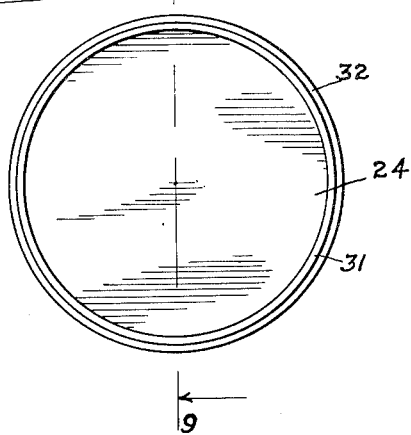
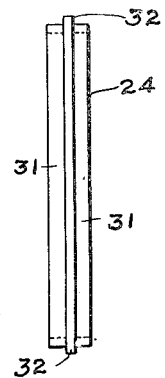
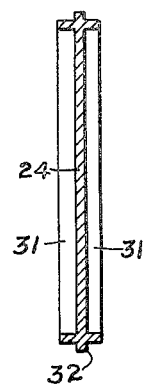
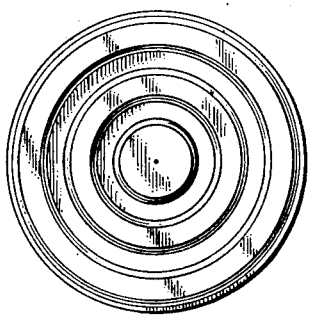
Inventor:
George E. Dath.
By Henry Fuchs.
Atty.

Patented Dec. 26, 1950

2,535,197

UNITED STATES PATENT OFFICE 2,535,197

SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application November 14, 1946, Serial No. 709,809

3 Claims. (Cl. 213—45)

1

This invention relates to improvements in shock absorbing mechanisms.

One object of the invention is to provide a shock absorbing mechanism, especially adapted for railway draft riggings, comprising cushioning means of resilient material, including a plurality of rubber pads or mats and metal spacing plates interposed between the rubber mats, wherein the spacing plates have means thereon for maintaining the mats centered.

A further object of the invention is to provide a shock absorbing mechanism of the character indicated including a compressible resilient cushioning unit composed of a plurality of rubber pads or mats alternated with metal spacing plates, wherein the plates are provided with laterally projecting flanges which overhang the mats, thereby protecting the same against damage.

Other objects of the invention will more clearly appear from the description and claims hereinafter following.

Figure 1:
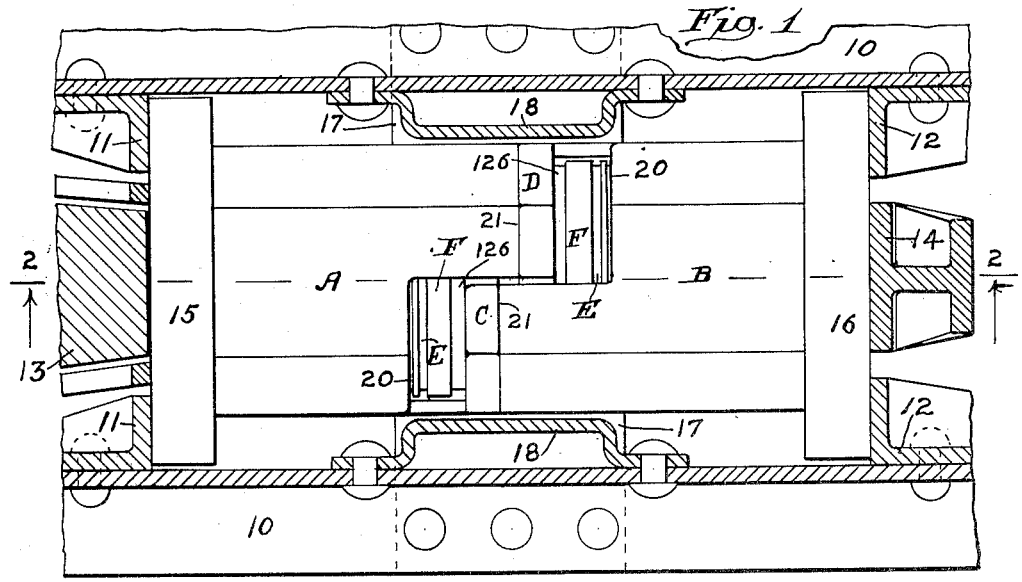
Figure 2:
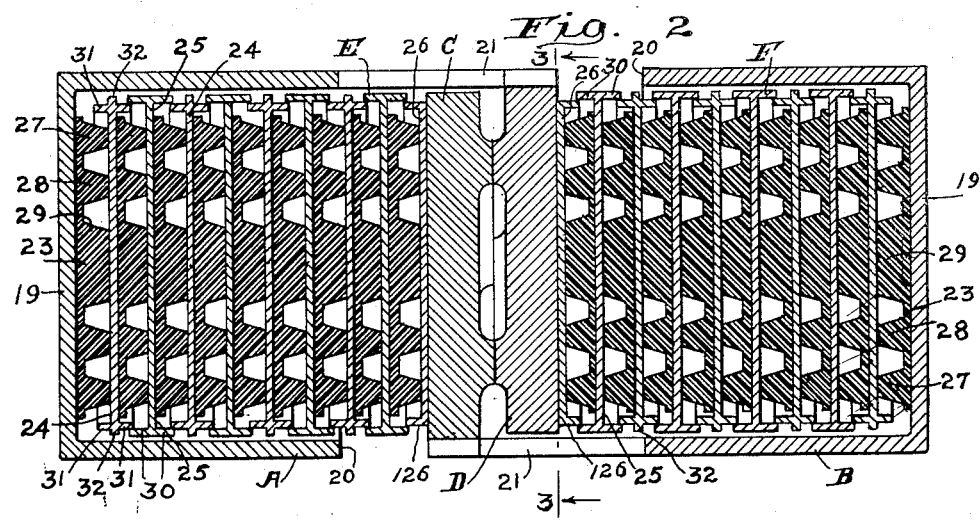
Figure 3:
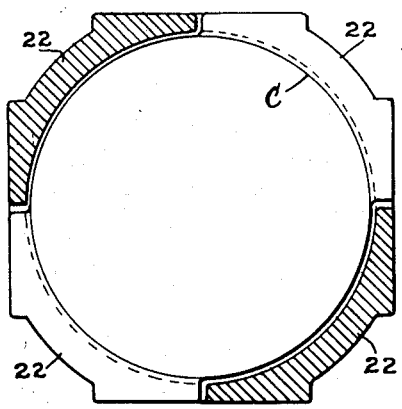

In the accompanying drawings forming a part of this specification, Figure 1 is a horizontal sectional view, through a portion of the underframe structure at one end of a railway car, illustrating my improved shock absorbing mechanism in connection therewith, the shock absorbing mechanism being shown in plan. Figure 2 is a longitudinal, vertical sectional view, corresponding substantially to the line 2—2 of Figure 1, showing my improved mechanism only, said view being on an enlarged scale. Figure 3 is a transverse, vertical sectional view, corresponding substantially to the line 3—3 of Figure 2. Figure 4 is a detail perspective view of a spacing plate employed at one end of the cushioning unit of my improved mechanism. Figure 5 is a plan view of one of the alternated spacing plates employed in the cushioning unit. Figure 6 is a side elevational view of Figure 5, looking from right to left in said figure. Figure 7 is a side elevational view of one of the spacing plates which are alternated with the plates of the design shown in Figures 5 and 6. Figure 8 is a side elevational view of Figure 7, looking from right to left in said figure. Figure 9 is a vertical sectional view, corresponding substantially to the line 9—9 of Figure 7. Figure 10 is a plan view of one of the rubber mats employed in the cushioning unit of my improved mechanism.

In the drawings, 10—10 indicate the longitudinally extending center or draft sills of a railway car underframe structure having the usual top and bottom flanges, the flanges at the bottom of the sills only being shown in Figure 1 of the drawings. On the inner sides, the sills are provided with front and rear stop lugs 11 and 12, commonly employed in railway draft riggings. The rear portion of the usual coupler shank is indicated by 13, to which is operatively connected a yoke 14 of well-known construction.

My improved shock absorbing mechanism and the corresponding front and rear followers 15 and 16 are disposed within the yoke, the followers 15 and 16 cooperating respectively with the front and rear stop lugs 11—11 and 12—12 in the usual manner. A saddle plate 17 secured to the bottom flanges of the sills 10—10 underlies the yoke 14 and supports the latter and the parts therewithin. The sills 10—10 are further provided with guides 18—18 secured to the inner sides thereof, which maintain the shock absorbing mechanism centered between the sills.

The improved shock absorbing mechanism illustrated is of the tandem type and is disposed within the yoke 14 between the front and rear followers 15 and 16 and comprises front and rear casings A and B, intermediate followers C and D, and front and rear cushioning units E and F within the casings and interposed respectively between the intermediate followers and the outer end walls of the casings.

The casings A and B are preferably in the form of castings of substantially identical design, but reversely arranged end for end. Each casing is in the form of a hollow, tubular member of substantially cylindrical, interior cross section, closed at its outer end by a transverse, vertical wall 19, which bears on the corresponding main follower, the end wall 19 of the casing A, which wall is at the front end thereof, bearing on the front follower 15 and the end wall 19 of the casing B, which wall is at the rear end thereof, bearing on the rear follower 16. The inner ends of the casings A and B are open, and the intermediate followers C and D are arranged between the inner ends of the casings, as clearly shown in Figures 1 and 2. The side walls of the casings are cut away at their inner ends at diagonally opposite corners, as indicated at 20—20, thus providing longitudinally projecting arms 21—21 at the remaining two diagonally opposite corners. The arms 21—21 of the casing A extend rearwardly and engage in the openings 20—20 between the arms 21—21 of the casing B, and the arms 21—21 of the latter extend forwardly and engage in the openings 20—20 between the arms 21—21 of the casing A.

The intermediate followers C and D are in the form of heavy, substantially circular plates, having outstanding wings or extensions 22—22 at diagonally opposite corners. The front intermediate follower C has the wings 22—22 thereof aligned with the arms 21—21 of the casing B and engaged by the front ends of said arms, and the rear intermediate follower D has the wings 22—22 thereof aligned with the arms 21—21 of the casing A and engaged by the rear ends of said arms.

The cushioning unit E is disposed within the casing A, being interposed between the front end wall 19 of said casing and the front intermediate follower C, and the cushioning unit F is disposed within the casing B, being interposed between the rear end wall 19 of said casing and the rear intermediate follower D.

The two cushioning units E and F are of similar design, each unit comprising a plurality of rubber pads or mats 23, and a plurality of metal plates 24, 25, and 26. As shown, the rubber mats 23 of each cushioning unit are arranged in series with the spacer plates interposed between and alternated with said mats.

The rubber mats 23 are in the form of circular discs having concentric, annular ribs or projections 27 and 28 and a central, relatively large boss 29 of circular outline laterally projecting from one side thereof. The ribs 27 and 28 and the boss 29 are preferably outwardly tapered, as shown in Figure 2. The opposite side of each mat is substantially flat.

The spacing plates 24, 25, and 26 are in the form of flat metal discs of larger diameter than the rubber mats 23. Each cushioning unit comprises a plurality of such plates 24 and 25 which serve to separate the rubber mats 23 of said unit, and a single plate 26 disposed at one end of said unit, the plate 26 of the cushioning unit E being located at the rear end thereof and bearing on the front intermediate follower C, and the plate 26 of the unit F being located at the front end thereof and bearing on the rear intermediate follower D. Each plate 26 has a laterally projecting, peripheral annular flange 126 at one side thereof arranged to partly overhang the adjacent mat 23. Each of the plates 25 has laterally projecting, transversely aligned, peripheral flanges 30—30 at opposite sides thereof which overhang the two rubber mats 23 which are located at opposite sides of said plate. The plates 24, which are alternated with the plates 25, are also provided with annular flanges, indicated by 31—31, which are at opposite sides thereof and which overhang the adjacent rubber mats, the flanges of each plate 24 being in transverse alignment and inset with respect to the periphery of said plate and telescoped within the annular flanges 30—30 of the adjacent plates 25—25. The peripheral extension of the plate 24 beyond the flanges 31—31 thereof, which extension is indicated by 32, forms a stop which is engageable by the outer edges of the telescoped flanges 30—30 of the adjacent plates 25. As disclosed in the drawings, each cushioning unit E and F preferably comprises nine rubber mats 23, four plates 24, four plates 25, and the single plate 26. The series of rubber mats 23 of each unit are similarly arranged so that the ribs thereof are at corresponding sides, that is, the unit E has the ribbed sides of the mats thereof facing rearwardly and the unit F has the ribbed sides of the mats facing forwardly. The arrangement of the parts of each cushioning unit is such that the mat 23 at one end thereof has its flat side bearing on the end wall 19 of the corresponding casing A or B and the mat 23 at the other end thereof has its ribbed side bearing on the single plate 26 of said unit, which, in turn, bears on the corresponding intermediate follower C or D. In other words, the mat 23, at the front end of the unit E, bears on the wall 19 of the casing A and the mat 23 at the rear end of the unit F bears on the wall 19 of the casing B, and the mat 23 at the rear end of the unit E bears on the plate 26 of said unit, which plate, in turn, bears on the front intermediate follower C, and the mat 23 at the front end of the unit F bears on the plate 26 of said unit, which plate, in turn, bears on the rear intermediate follower D.

The four plates 24 and the four plates 25, which serve to separate the mats 23 of each cushioning unit, are alternated with each other, as hereinbefore pointed out, each set of plates 24 and 25 forming a group having a plate 24 at one end and a plate 25 at the other end. A plate 24 is at the front end of the unit E and bears on the inner side of the mat 23 at the front end of this unit, and a plate 25 is at the rear end of the unit E, bears on the inner side of the mat 23 at the rear end of said unit and has its flange 30 telescoped over the flange 126 of the plate 26. A plate 24 is at the rear end of the unit F and bears on the mat 23 at the rear end of said unit and a plate 25 is at the front end of this unit, bears on the mat 23 at the front end of this unit, bears on the mat 23 at the front end of the same, and has its flange 30 telescoped over the flange 126 of the plate 26.

As will be evident, the overlapping arrangement of the flanges of the plates 24, 25, and 26 serves to enclose and fully protect the rubber mats against damage during all stages of operation of the mechanism and also holds the mats properly centered.

In the operation of my improved shock absorbing mechanism, the same is compressed between the front and rear followers 15 and 16 of the draft rigging as these followers are moved relatively toward each other in buff or draft, the front follower 15 being moved rearwardly in buff while the rear follower 16 remains stationary, and the rear follower 16 being moved forwardly in draft while the front follower 15 remains stationary. As the front follower moves rearwardly in buff, the casing A is forced rearwardly therewith and the rear intermediate follower D is also forced to move rearwardly by the arms 21—21 of the casing A, which arms are engaged therewith. The cushioning elements E and F of the front and rear casings A and B are thus compressed respectively between the end wall 19 of the casing A and the front intermediate follower C, and the rear intermediate follower D and the end wall 19 of the casing B, the front intermediate follower C being held stationary at this time by the arms 21—21 of the rear casing B, which is held against rearward movement by the main follower 16 on which it bears. In draft, the operation is reversed, the rear casing B being moved forwardly by the main follower 16 and the front casing being held stationary by the front main follower 15, the front intermediate follower C which moves with the casing B compressing the front cushioning element E against the front wall of the casing A and the rear cushioning unit F being compressed between the wall 19 of the forwardly moving casing B and the rear intermediate follower D, which at this time is held stationary by the arms 21—21 of the casing A. As the cushioning units E and F are compressed, the pads or mats 23 of these units are compressed or flattened out between the plates 24, 25, and 26. In flattening out the pads or mats, the material of the ribs or projections thereof is displaced or flows into the spaces between said ribs and projections. Compression of the mechanism continues until relative displacement of the plates of each unit with respect to each other is limited by the flanges thereof, the flanges and the engaged plates forming a solid column to transmit the load, thereby protecting the pads or mats against undue compression.

I claim:

1. In a cushioning unit for shock absorbing mechanisms, the combination with a series of rubber mats; of a plate bearing on the mat at one end of said series; and a series of spacing plates alternated with said mats, one of said plates of said series being interposed between the rubber mat at said end of the series and the remaining mats of said series, each plate of said series having flanges at opposite sides thereof overhanging the adjacent mats, the flanges of the plates of said series being telescoped with each other, and said first named plate having a flange overhanging the adjacent mat and telescoped with the corresponding flange of the adjacent plate of said series of plates.

2. In a cushioning unit for shock absorbing mechanisms, the combination with a series of rubber mats; of a plate bearing on the mat at one end of said series, said plate having a peripheral flange overhanging said last named mat; and a series of plates alternated with said mats, each of said plates of said series having peripheral flanges at opposite sides thereof overhanging the adjacent mats, one of said plates of said series being interposed between the rubber mat at said end of the series of mats and the remaining mats of said series, the flanges of the plates of said series being telescoped with each other, and the plate which is interposed between said mat at the end of said series and the remaining mats of said series having the flange at one side thereof telescoped with the flange of said first named plate.

3. In a shock absorber, the combination with a casing closed at one end and open at the other end; of a follower slidingly telescoped within the open end of said casing; a cushioning unit within said casing including a series of rubber mats and a series of spacing plates alternated with said mats, said spacing plates having flanges at opposite sides thereof overhanging the adjacent mats, said flanges being telescoped with each other, the mat at one end of said series bearing on the closed end of the casing; and a plate interposed between the follower and the mat at the other end of said series, said plate having a flange overhanging the adjacent mat and telescoped with the flange at the corresponding side of the spacing plate at said end of the series of spacing plates.

GEORGE E. DATH.

REFERENCES CITED

The following references are of record in the file of this patent:

UNITED STATES PATENTS

| Number | Name | Date |
|---|---|---|
| 2,165,383 | Johnson et al. | July 11, 1939 |
| 2,187,156 | Johnson | Jan. 16, 1940 |
| 2,205,098 | Lamont | June 18, 1940 |
| 2,404,637 | Jones | July 23, 1946 |